US008882569B2

(12) United States Patent
Ochi et al.

(10) Patent No.: US 8,882,569 B2
(45) Date of Patent: Nov. 11, 2014

(54) GEAR GRINDING MACHINE

(75) Inventors: Masashi Ochi, Ritto (JP); Yoshikoto Yanase, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 366 days.

(21) Appl. No.: 13/498,776

(22) PCT Filed: Sep. 29, 2009

(86) PCT No.: PCT/JP2009/066951
§ 371 (c)(1),
(2), (4) Date: May 23, 2012

(87) PCT Pub. No.: WO2011/039838
PCT Pub. Date: Apr. 7, 2011

(65) Prior Publication Data
US 2012/0225614 A1 Sep. 6, 2012

(51) Int. Cl.
*B24B 21/18* (2006.01)
(52) U.S. Cl.
USPC ............................ 451/443; 451/56; 125/11.01
(58) Field of Classification Search
USPC ................. 451/5, 10, 11, 56, 443; 125/11.01, 125/11.02
See application file for complete search history.

(56) References Cited

U.S. PATENT DOCUMENTS

| | | | | |
|---|---|---|---|---|
| 5,076,020 A | * | 12/1991 | Negri | 451/21 |
| 5,738,569 A | * | 4/1998 | Mackowsky | 451/56 |
| 6,217,409 B1 | * | 4/2001 | Stadtfeld et al. | 451/5 |
| 7,083,496 B2 | * | 8/2006 | Yanase et al. | 451/5 |
| 7,198,543 B2 | * | 4/2007 | Yanase et al. | 451/5 |
| 7,341,501 B2 | * | 3/2008 | Yanase et al. | 451/5 |
| 2003/0027507 A1 | | 2/2003 | Stollberg | |
| 2007/0202774 A1 | * | 8/2007 | Yanase et al. | 451/5 |
| 2009/0227182 A1 | | 9/2009 | Breith et al. | |

FOREIGN PATENT DOCUMENTS

| | | |
|---|---|---|
| JP | 62-192844 U | 12/1987 |
| JP | 2-104947 U | 8/1990 |
| JP | 7-266227 A | 10/1995 |
| JP | 2003-39237 A | 2/2003 |

(Continued)

OTHER PUBLICATIONS

Chinese Office Action dated Dec. 2, 2013 in related Chinese Application No. 200980161717.1.

(Continued)

*Primary Examiner* — Eileen P. Morgan
(74) *Attorney, Agent, or Firm* — Birch, Stewart, Kolasch & Birch, LLP

(57) ABSTRACT

Provided is a gear grinding machine the maintainability of which can be improved and which is capable of being miniaturized. More specifically, provided is a gear grinding machine wherein a threaded grinding stone (17) and a workpiece (W) are engaged with each other and are rotated in this state, resulting in the workpiece (W) being ground, and wherein between a dressing position (P2) where the threaded grinding stone (17) can be dressed and a retreat position (P1) to which a retreat is made from the dressing position (P2) during grinding, a disk dresser (66) which, by being driven into rotation, dresses the threaded grinding stone (17) is swung about an axis (C2) which is parallel to an axis (C1) that is the rotational axis for the workpiece (W) and which intersects, at right angles, the direction in which the threaded grinding stone (17) is fed toward the workpiece (W).

3 Claims, 5 Drawing Sheets

(56) References Cited

FOREIGN PATENT DOCUMENTS

| | | |
|---|---|---|
| JP | 2005-111600 A | 4/2005 |
| JP | 2005-262333 A | 9/2005 |
| JP | 2007-229841 A | 9/2007 |

OTHER PUBLICATIONS

Japanese Notice of Allowance dated Nov. 6, 2012 with English translation.
Japanese Office Action dated Jul. 30, 2012 with English translation.

* cited by examiner

GEAR GRINDING MACHINE

TECHNICAL FIELD

The present invention relates to a gear grinding machine for grinding a gear to be machined with a grinding wheel, and particularly to a gear grinding machine having the dressing function of dressing the grinding wheel.

BACKGROUND ART

Heretofore, gear grinding machines have been provided to efficiently finish the faces of the teeth of a workpiece, which is a heat-treated gear to be machined, by grinding the workpiece with a grinding wheel, which is a grinding tool. In such a gear grinding machine, repeated grinding causes a decrease in sharpness of the grinding wheel due to the wear thereof. Accordingly, after a predetermined number of workpieces have been ground, the worn grinding wheel needs to be dressed to restore the sharpness of the faces of the threads thereof.

For this reason, conventional gear grinding machines have the dressing function of dressing a worn grinding wheel with a dresser. Such a gear grinding machine having the dressing function is disclosed in, for example, Patent Literature 1.

PRIOR ART DOCUMENT

Patent Document

Patent Document 1: Japanese Patent Application Publication No. 2005-111600

SUMMARY OF THE INVENTION

Problem to be Solved by the Invention

In the above-described conventional gear grinding machine, a turning ring is turnably supported on the outer periphery of a counter column standing upright to face a grinding wheel. Further, a pair of grippers each capable of gripping a workpiece and a dresser disposed between the pair of grippers are provided on the turning ring. Moreover, turning any one of the grippers so that the gripper may face a rotary table capable of holding a workpiece allows a workpiece to be loaded onto and unloaded from the rotary table, and turning the dresser so that the dresser may face the grinding wheel allows dressing to be performed.

However, in such a conventional configuration, because both the grippers and the dresser are provided on the turning ring, when any one of grinding and dressing operations is being performed, while any one of grinding and dressing operations is being performed, maintenance cannot be performed for the other one of these operations. Moreover, the dresser is usually provided with dresser drive means or the like for rotationally driving the dresser, and therefore is often a heavy component. In order to support such a heavy dresser, the size of the turning ring must be increased. Furthermore, an increase in the size of the turning ring requires a large driving force to turn the turning ring, and also increases the size of turning ring drive means for turning the turning ring. This may result in an increase in the size of the gear grinding machine.

Accordingly, the present invention has been made to solve the above-described problems, and an object of the present invention is to provide a gear grinding machine in which an improvement in maintainability and miniaturization can be achieved.

Means for solving the Problems

A gear grinding machine according to a first aspect of the invention to solve the above-described problem is characterized by comprising: a dresser which is rotationally driven to dress the grinding wheel; and dresser pivoting means for pivoting the dresser between a dressing position where the dresser can dress the grinding wheel and a retreat position where the dresser retreats from the dressing position at the time of grinding, about a pivot parallel to a work rotation axis of the gear and perpendicular to a feed direction of the grinding wheel to the gear.

A gear grinding machine according to a second aspect of the invention to solve the above-described problem is characterized in that the dresser pivoting means comprises: a rotating portion by which the dresser is rotatably supported and which rotates about the pivot; a fixing portion by which the rotating portion is rotatably supported; positioning means for positioning rotation of the rotating portion with respect to the fixing portion; positioning release means which is provided in the fixing portion and which uses leverage to release the positioning by the positioning means; and rotation means for allowing the rotating portion to rotate when the positioning release means actuates.

A gear grinding machine according to a third aspect of the invention to solve the above-described problem is characterized in that the positioning release means comprises: a cylinder portion formed in the fixing portion; a piston member housed in the cylinder portion to be slidable in the direction of the pivot; an annular groove portion formed in the rotating portion; a lever having a base end portion swingably supported by the fixing portion and a tip portion held by the piston member; rollers fitted into the groove portion and rotatably supported by the lever; and pressure feeding and discharging means for feeding and discharging pressure to/from the cylinder portion to allow the piston member to slide.

A gear grinding machine according to a fourth aspect of the invention to solve the above-described problem is characterized in that the groove portion is disposed in a through-hole formed in the lever, and the rollers are rotatably supported on an inner circumferential surface of the through-hole.

A gear grinding machine according to a fifth aspect of the invention to solve the above-described problem is characterized in that a retainer pin is supported between tip portions of the lever which form a bifurcated shape, and a retaining groove for holding the retainer pin is formed in the piston member.

Effect of the Invention

Accordingly, in the gear grinding machine according to the present invention, the dresser which is rotationally driven to dress the grinding wheel is pivoted between the dressing position where the dresser can dress the grinding wheel and the retreat position where the dresser retreats from the dressing position at the time of grinding, about the pivot parallel to the rotation axis of the gear to be machined as a workpiece and perpendicular to the feed direction of the grinding wheel to the gear. Thus, an improvement in maintainability and miniaturization can be achieved.

MODE FOR CARRYING OUT THE INVENTION

Hereinafter, a gear grinding machine according to the present invention will be described in detail with reference to the drawings.

Embodiment

Figure 1:
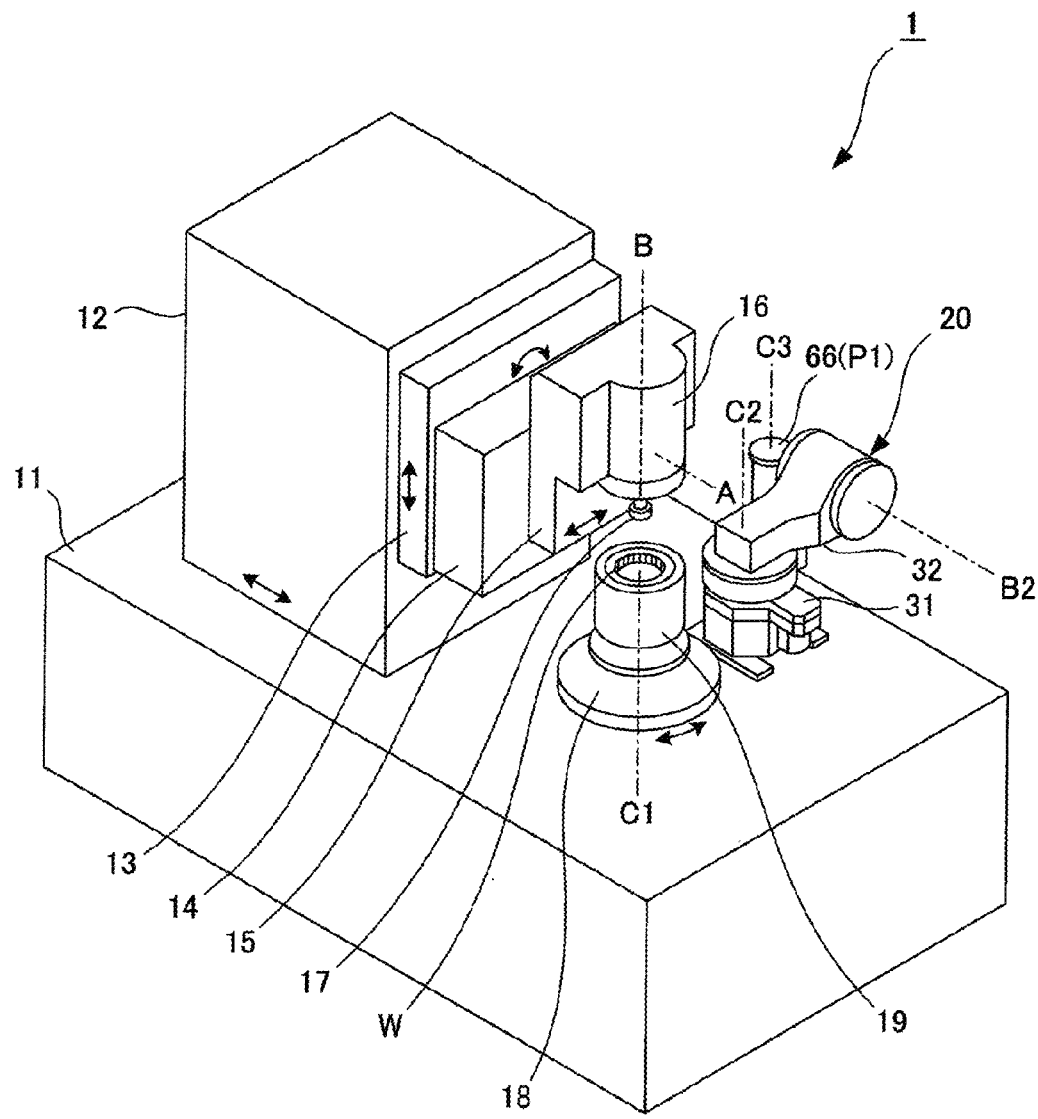
FIG. 1 is a perspective view of a gear grinding machine according to one example of the present invention.

As shown in FIG. 1, a column 12 is supported on a bed 11 of a gear grinding machine 1 to be movable in the direction (feed direction) of a horizontal X axis. A saddle 13 is supported on the column 12 to be movable up and down in the direction of a vertical Z axis. A turning head 14 is supported on this saddle 13 to be turnable about a horizontal A axis. A slide head 15 is supported on the turning head 14 to be movable in the direction of a horizontal Y axis. This slide head 15 is provided with a grinding wheel head 16. Further, a barrel-shaped threaded grinding wheel 17 is removably supported by the grinding wheel head 16 to be rotatable about a vertical B axis. This threaded grinding wheel 17 is rotationally driven by an unillustrated grinding wheel drive motor built in the grinding wheel head 16.

Moreover, on the bed 11, a rotary table 18 is provided in front of the column 12 to be rotatable about a vertical C1 axis (a work rotation axis). A cylindrical mounting jig 19 is attached to the upper surface of the rotary table 18. A workpiece (gear to be machined) W which is a material of an internal gear is removably attached to the inner circumferential surface of the upper end of this mounting jig 19. At a side of the rotary table 18, a dresser pivoting device (dresser pivoting means) 20 is provided. On this dresser pivoting device 20, a disc dresser 66 for dressing the threaded grinding wheel 17 is supported to be pivotable about a C2 axis (pivot) as described in detail later.

Figure 2:
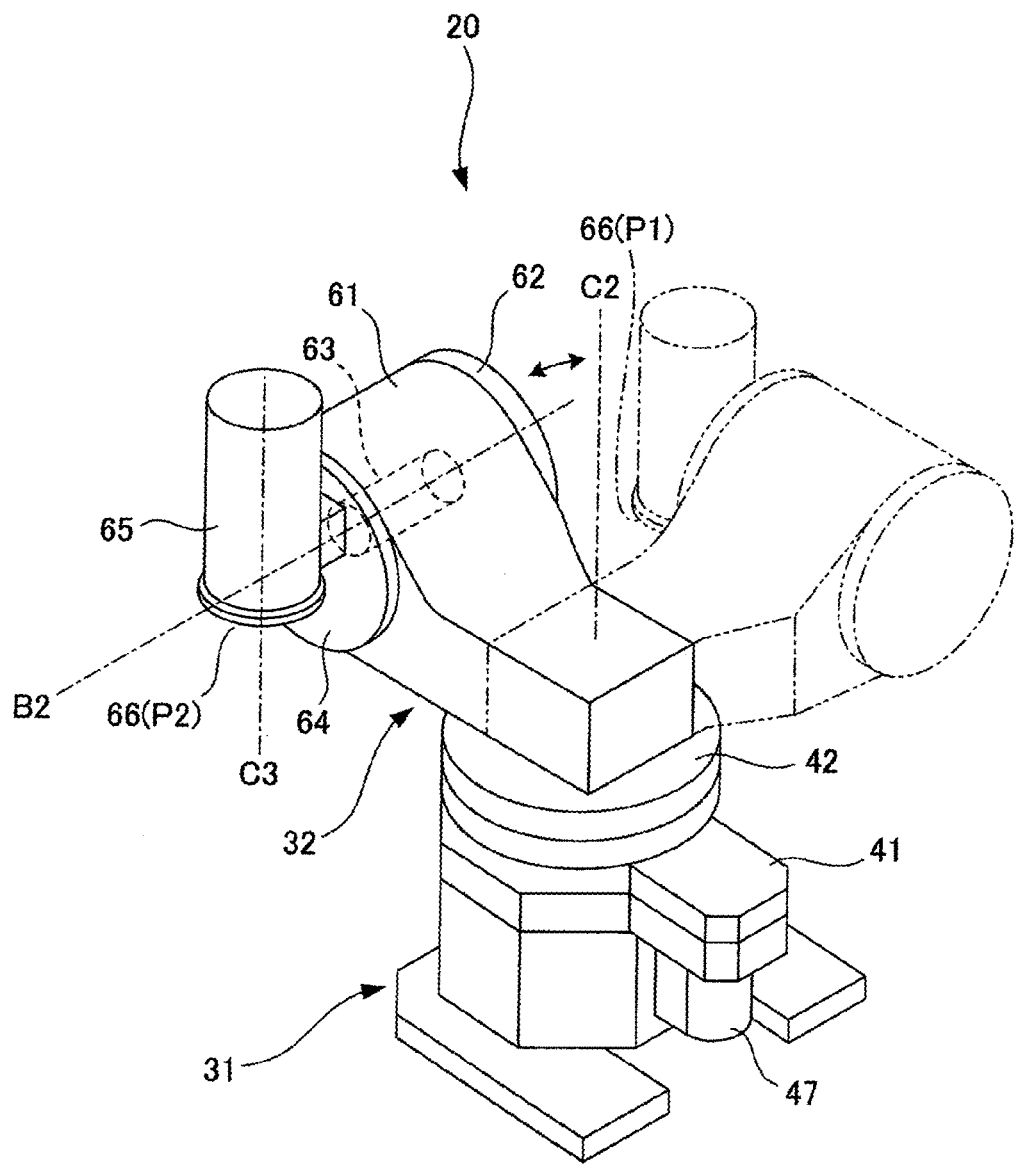
FIG. 2 is a perspective view of a dresser pivoting device.

As shown in FIGS. 1 and 2, the dresser pivoting device 20 includes a base unit 31 and a pivoting unit 32 provided on this base unit 31. The base unit 31 is provided on the bed 11, and the pivoting unit 32 is supported on a central portion of the upper surface of the base unit 31 to be pivotable about the C2 axis.

Figure 3:
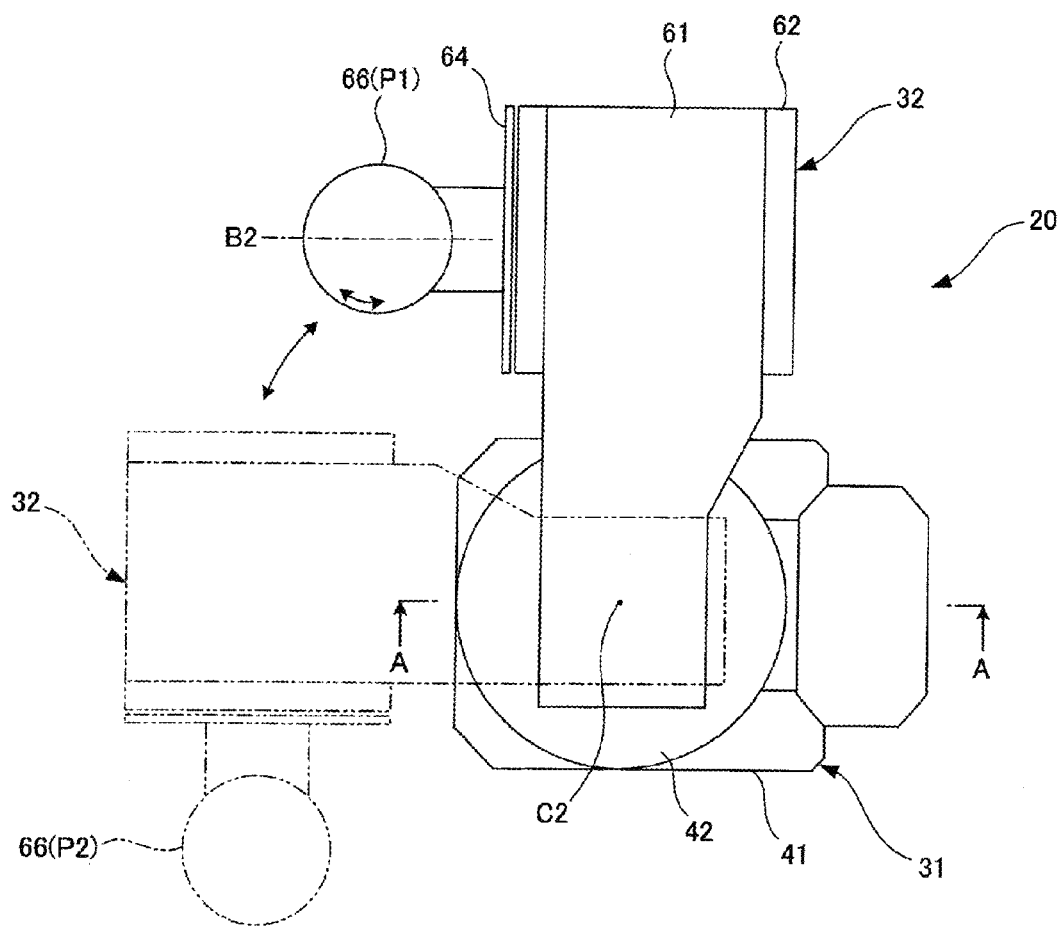
FIG. 3 is a plan view of the dresser pivoting device.
Figure 4:
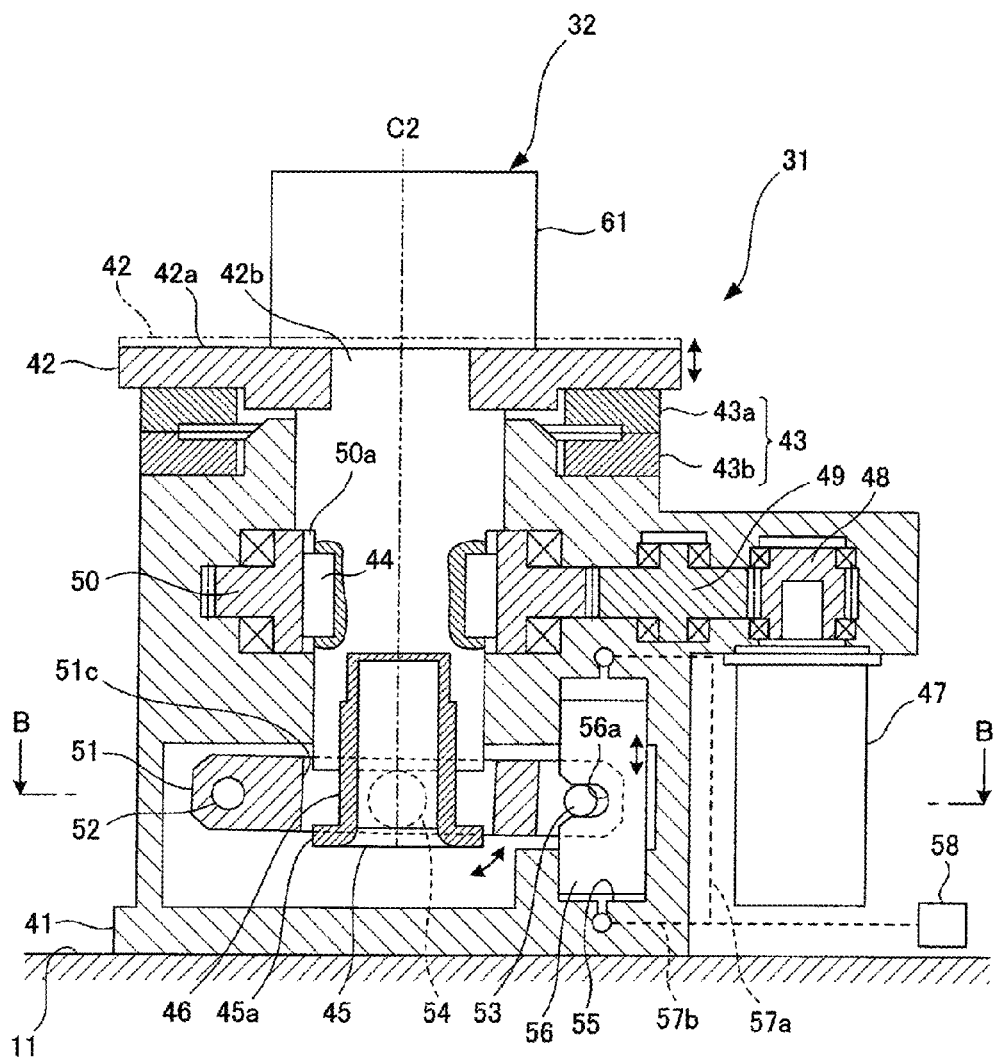
FIG. 4 is a cross sectional view taken along arrow A-A in FIG. 3.
Figure 5:
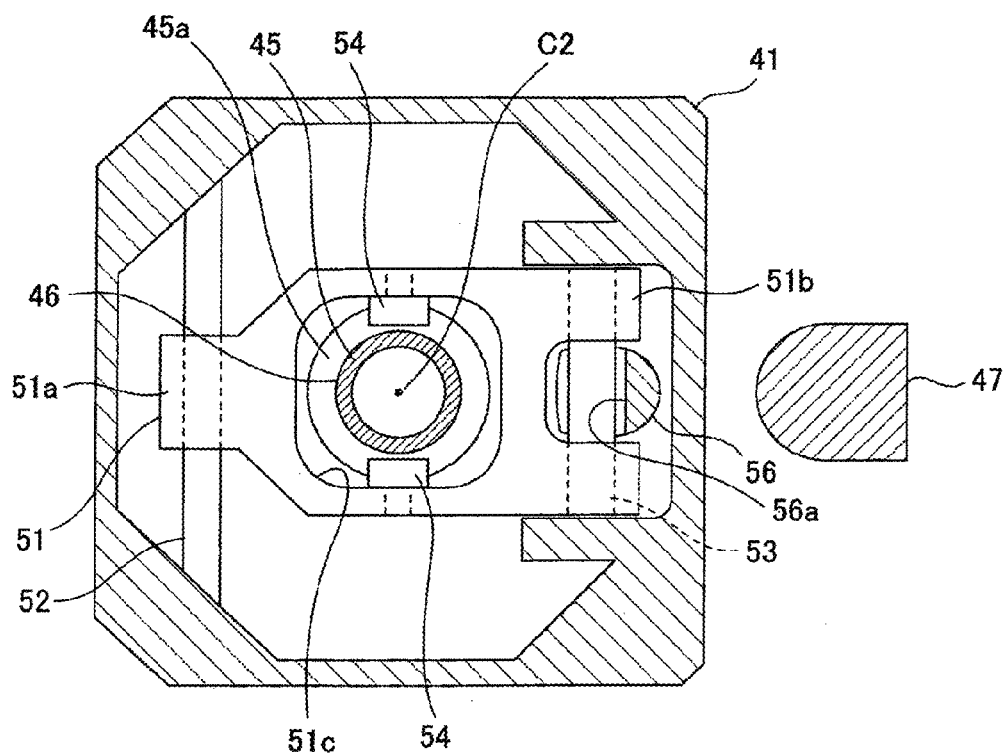
FIG. 5 is a cross sectional view taken along arrow B-B in FIG. 4.

As shown in FIGS. 3 to 5, the base unit 31 includes a fixing portion 41 and a rotating portion 42. The fixing portion 41 is fixed on the bed 11, and the rotating portion 42 is rotatably supported in a central portion of the fixing portion 41.

The rotating portion 42 is disposed coaxially with the C2 axis, and includes a circular rotating plate 42a and a shaft-shaped shank 42b. Between the rotating plate 42a of the rotating portion 42 and the fixing portion 41, a gear coupling (positioning means) 43 is interposed. While an upper gear member 43a of the gear coupling 43 is provided on the lower surface of the rotating plate 42a, a lower gear member 43b of the gear coupling 43 is provided on the upper surface of the fixing portion 41. Further, keys 44 are provided in an intermediate portion of the shank 42b with respect to the axial direction thereof. A cylindrical flange member 45 is fitted into the lower end of the shank 42b. Moreover, the lower end of the shank 42b, and the outer circumferential surface and a flange portion 45a of the flange member 45 form an annular groove portion 46 which is recessed the outer circumferential surface of the shank 42b.

At a side of the fixing portion 41, a horizontally pivoting drive motor (rotation means) 47 is provided. In an intermediate portion of the fixing portion 41 with respect to the height direction thereof, a drive gear 48, an intermediate gear 49, and a driven gear 50 are rotatably supported. The drive gear 48 and the intermediate gear 49 mesh with each other, and the intermediate gear 49 and the driven gear 50 mesh with each other. While the drive gear 48 is fitted to the output shaft of the horizontally pivoting drive motor 47, the driven gear 50 is disposed around the shank 42b of the rotating portion 42. Further, key grooves 50a are formed in the inner circumferential surface of the driven gear 50. By these key grooves 50a, the keys 44 of the shank 42b are supported to be slidable in the direction of the C2 axis.

In a lower portion of the fixing portion 41, a lever 51 is housed. The lever 51 has a base end portion 51a having a small width and tip portions 51b forming a bifurcated shape. While the base end portion 51a is swingably supported in the fixing portion 41 through a swing pin 52, the tip portions 51b support a retainer pin 53 therebetween. Furthermore, a through-hole 51c is formed in the lever 51, and the flange member 45 of the shank 42b is passed through this through-hole 51c. Further, rollers 54 are rotatably supported on the inner circumferential surface of the through-hole 51c. These rollers 54 are fitted into the groove portion 46.

Between the tip portions 51b of the lever 51, a cylinder portion 55 is formed. In this cylinder portion 55, a piston member 56 is housed to be slidable in the direction of the C2 axis. In a side wall of the piston member 56 on the lever 51 side, a retaining groove 56a recessed in the width direction thereof is formed. This retaining groove 56a holds the retainer pin 53 between the tip portions 51b. Further, hydraulic oil paths 57a and 57b communicate with upper and lower portions of the cylinder portion 55, respectively. These hydraulic oil paths 57a and 57b are connected to a hydraulic pressure feeding and discharging device (pressure feeding and discharging means) 58. Specifically, the hydraulic pressure feeding and discharging device 58 causes hydraulic pressure to be fed to and discharged from the inside of the cylinder portion 55 through the hydraulic oil paths 57a and 57b.

It should be noted that the groove portion 46, the lever 51, the rollers 54, the cylinder portion 55, the piston member 56, the hydraulic pressure feeding and discharging device 58, and the like constitute positioning release means.

On the other hand, as shown in FIGS. 2 and 3, the pivoting unit 32 includes a body portion 61 and a motor housing portion 62. The base end of the body portion 61 is fixed on the rotating plate 42a of the base unit 31. The motor housing portion 62 is formed in the shape of a cylinder and provided at an end of the body portion 61.

In the motor housing portion 62, a vertical turn drive motor 63 is built. The output shaft of this vertical turn drive motor 63 is rotationally driven about the horizontal B2 axis and connected to the rotating plate 64 on the outside of the motor housing portion 62. Moreover, a dresser rotational drive motor 65 is provided on the rotating plate 64. The output shaft of this dresser rotational drive motor 65 is rotationally driven about a C3 axis, and has a disk-shaped disc dresser 66 removably attached thereto.

Specifically, the feed of hydraulic pressure from the hydraulic pressure feeding and discharging device 58 to the lower portion of the cylinder portion 55 through a hydraulic oil path 57b causes the piston member 56 to slide upward. This causes the tip portions 51b of the lever 51 to swing upward with the piston member 56 about the swing pin 52. Along with this, the rollers 54 push the upper surface of the groove portion 46. As a result, the rotating portion 42 is lifted to an upper position (position indicated by a two-dot chain line of FIG. 4) with respect to the fixing portion 41. Thus, the meshing of the gear coupling 43 between the fixing portion 41 and the rotating portion 42 is released. In other words, the positioning of the rotating portion 42 with respect to the fixing portion 41 is released.

On the other hand, the feed of hydraulic pressure from the hydraulic pressure feeding and discharging device 58 to the upper portion of the cylinder portion 55 through the hydraulic oil path 57a with the rotating portion 42 lifted up as described above causes the piston member 56 to slide downward. This causes the tip portions 51b of the lever 51 to swing downward with the piston member 56 about the swing pin 52. Along with this, the rollers 54 push the lower surface of the groove portion 46. As a result, the rotating portion 42 is lowered to a lowest position (position indicated by a solid line of FIG. 4) in the fixing portion 41. Thus, the gear coupling 43 between the fixing portion 41 and the rotating portion 42 is brought into mesh. In other words, the rotating portion 42 is positioned with respect to the fixing portion 41.

Furthermore, the driving of the horizontally pivoting drive motor 47 with the rotating portion 42 lifted up causes the driving force thereof to be propagated to the drive gear 48, the intermediate gear 49, and the driven gear 50 in order, resulting in the rotation of the rotating portion 42 about the C2 axis. At this time, since the rotation of the rollers 54 allows the groove portion 46 to slide smoothly, the lifted rotating portion 42 rotates smoothly. Thus, the disc dresser 66 of the pivoting unit 32 pivots about the C2 axis. This disc dresser 66 is pivoted between a retreat position P1 and a dressing position P2 (see FIGS. 2 and 3). These positions will be described later.

In a state in which the disc dresser 66 is positioned at the dress position P2 by the gear coupling 43, the driving of the vertical turn drive motor 63 causes the disc dresser 66 to turn about the B2 axis, and the driving of the dresser rotational drive motor 65 causes the disc dresser 66 to be rotationally driven about the C3 axis. This causes the disc dresser 66 to dress the threaded grinding wheel 17 facing the disc dresser 66.

Accordingly, the grinding of the workpiece W with the gear grinding machine 1 starts with attaching the workpiece W to the mounting jig 19. Subsequently, the threaded grinding wheel 17 is moved in the directions of the X, Y, and Z axes by driving the column 12, the saddle 13, the turning head 14, and the slide head 15, and turned about the A axis in accordance with the helix angle of the workpiece W to be placed at the inside of the workpiece W. Then, the threaded grinding wheel 17 is rotationally driven about the B axis by driving the grinding wheel head 16, and the workpiece W is rotationally driven about the C1 axis by driving the rotary table 18. After that, by driving the column 12 in this state, the threaded grinding wheel 17 is moved in the direction of the X axis (to the left in FIG. 1) to be meshed with the workpiece W. Subsequently, the threaded grinding wheel 17 is swung in the direction of the Z axis while being moved in the direction of the X axis by further driving the column 12 and the saddle 13. This causes the threaded grinding wheel 17 to cut into the workpiece W. As a result, the faces of the teeth of the workpiece W are ground by the faces of the threads of the threaded grinding wheel 17.

What should be noted here is that the use of the threaded grinding wheel 17 to grind a certain number of workpieces W causes a decrease in sharpness of the threaded grinding wheel 17 due to the wear of the faces of the threads thereof. To address this decrease, the dressing of the threaded grinding wheel 17 needs to be carried out on a regular basis by pivoting the disc dresser 66.

The dressing of the threaded grinding wheel 17 with the disc dresser 66 starts with feeding hydraulic pressure from the hydraulic pressure feeding and discharging device 58 to the lower portion of the cylinder portion 55 through the hydraulic oil path 57b to cause the piston member 56 to slide upward. As a result, in the base unit 31, the rotating portion 42 is lifted up with respect to the fixing portion 41 by the leverage of the lever 51. Thus, the meshing of the gear coupling 43 is released (position indicated by a two-dot chain line in FIG. 4). Specifically, the pivoting unit 32 is lifted upward, and the positioning of the disc dresser 66 at the retreat position P1 is released. Subsequently, the horizontally pivoting drive motor 47 is driven to rotate the rotating portion 42 of the base unit 31. Thus, the pivoting unit 32 is pivoted by a predetermined angle. This causes the disc dresser 66 to be pivoted from the retreat position P1 to the dressing position P2 as shown in FIGS. 2 and 3. It should be noted that in this example, the disc dresser 66 is pivoted by 90 degrees.

Then, hydraulic pressure is fed from the hydraulic pressure feeding and discharging device 58 to the upper portion of the cylinder portion 55 through the hydraulic oil path 57a to cause the piston member 56 to slide downward. As a result, in the base unit 31, the rotating portion 42 is lowered to the lowest position in the fixing portion 41 by the leverage of the lever 51. Thus, the gear coupling 43 is brought into mesh (position indicated by a solid line of FIG. 4). Specifically, the pivoting unit 32 is pushed downward, and the disc dresser 66 at the dressing position P2 is positioned. Subsequently, the vertical turn drive motor 63 is driven to turn the disc dresser 66 about the B2 axis in accordance with the helix angle of the threaded grinding wheel 17.

On the other hand, the threaded grinding wheel 17 is moved in the directions of the X, Y, and Z axes to a position opposite the disc dresser 66 placed at the dressing position P2 by driving the column 12, the saddle 13, and the slide head 15. It should be noted that when the threaded grinding wheel 17 is moved as described above, the threaded grinding wheel 17 is turned by driving the turning head 14 so that the shaft center of the threaded grinding wheel 17 may extend in the vertical direction (turning angle is zero degrees).

Then, the disc dresser 66 is rotationally driven about the C3 axis by driving the dresser rotational drive motor 65. After that, by driving the slide head 15 in this state, the threaded grinding wheel 17 is moved in the direction of the Y axis to be meshed with the disc dresser 66 placed at the dressing position P2. Subsequently, the threaded grinding wheel 17 is swung in the direction of the Z axis while being moved in the direction of the Y axis by further driving the saddle 13 and the slide head 15. This causes the threaded grinding wheel 17 to cut into the disc dresser 66. As a result, the faces of the threads of the threaded grinding wheel 17 are dressed by the faces of the blade of the disc dresser 66. This dressing operation is performed a number of times equal to the number of thread grooves of the threaded grinding wheel 17.

When the above-described dressing operation is finished, the disc dresser 66 is pivoted from the dressing position P2 to the retreat position P1 to be brought to a waiting state, and a predetermined number of workpieces W are ground with the threaded grinding wheel 17 after dressing. Then, such a series of operations are repeated.

It should be noted that the gear grinding machine according to the present invention has been applied to an internal gear grinding machine for use in grinding a workpiece as a material of an internal gear in this example, but may be applied to an external gear grinding machine for use in grinding a workpiece as a material of an external gear.

Accordingly, in the gear grinding machine according to the present invention, since the disc dresser 66 is pivoted between the retreat position P1 and the dressing position P2 about the C2 axis parallel to the C1 axis, which is the rotation axis of the workpiece W, and perpendicular to the feed direction (direction of the X axis) of the threaded grinding wheel 17 to the workpiece W, the dresser pivoting device 20 can be disposed outward of the rotary table 18, to which the column 12 supporting the threaded grinding wheel 17 and the workpiece W are attached, with respect to the width direction (direction of the Y axis). This prevents the disc dresser 66 placed at the retreat position P1 from interfering with grinding operation and workpiece replacement, and facilitates access to this disc dresser 66 from outside the machine, thus making it possible to improve maintainability in dresser replacement and the like. Besides, since the disc dresser 66 is configured to pivot, the disc dresser 66 can be moved toward or away from the threaded grinding wheel 17 in a space-saving manner. Accordingly, the gear grinding machine 1 can be miniaturized.

Moreover, the disc dresser 66 is positioned by the gear coupling 43 at the retreat position P1 or the dressing position P2. Accordingly, for each of the retreat position P1 and the dressing position P2, the disc dresser 66 can always be placed at the same position and can be supported with high rigidity. This improves the reproducibility of placement of the disc dresser 66 at the dressing position P2, and therefore results in not only improved dressing accuracy but also quality kept at a certain level.

Furthermore, using the leverage of the lever 51, the gear coupling 43 is brought into mesh and released from the mesh, i.e., the rotating portion 42 is moved up and down with respect to the fixing portion 41. Accordingly, the operation of positioning the disc dresser 66 and the operation of releasing the positioning thereof can be performed with a small driving force. Thus, the cylinder portion 55, the piston member 56 housed therein, and the hydraulic pressure feeding and discharging device 58 can be made small. As a result, the height of the fixing portion 41 can be reduced, and therefore the dresser pivoting device 20 can be miniaturized.

INDUSTRIAL APPLICABILITY

The present invention can be applied to a gear grinding machine which increases the speed of dressing operation at the time of non-grinding.

The invention claimed is:

1. A gear grinding machine for use in grinding a gear to be machined while rotating a grinding wheel and the gear in mesh with each other, the gear grinding machine comprising:
a dresser which is rotationally driven to dress the grinding wheel; and
dresser pivoting means for pivoting the dresser between a dressing position where the dresser can dress the grinding wheel and a retreat position where the dresser retreats from the dressing position at the time of grinding, about a pivot parallel to a work rotation axis of the gear and perpendicular to a feed direction of the grinding wheel to the gear, the gear grinding machine characterized in that
the dresser pivoting means comprises:
a rotating portion by which the dresser is rotatably supported and which rotates about the pivot;
a fixing portion by which the rotating portion is rotatably supported;
positioning means for positioning rotation of the rotating portion with respect to the fixing portion;
positioning release means which is provided in the fixing portion and which uses leverage to release the positioning by the positioning means; and
rotation means for allowing the rotating portion to rotate when the positioning release means actuates,
the positioning release means comprises:
a cylinder portion formed in the fixing portion;
a piston member housed in the cylinder portion to be slidable in the direction of the pivot;
an annular groove portion formed in the rotating portion;
a lever having a base end portion swingably supported by the fixing portion and a tip portion held by the piston member;
rollers fitted into the groove portion and rotatably supported by the lever; and
pressure feeding and discharging means for feeding and discharging pressure to/from the cylinder portion to allow the piston member to slide.

2. The gear grinding machine according to claim 1, wherein
the groove portion is disposed in a through-hole formed in the lever, and
the rollers are rotatably supported on an inner circumferential surface of the through-hole.

3. The gear grinding machine according to claim 1, wherein
a retainer pin is supported between tip portions of the lever which form a bifurcated shape, and
a retaining groove for holding the retainer pin is formed in the piston member.

* * * * *